United States Patent [19]

Ficalora

[11] Patent Number: 5,022,759
[45] Date of Patent: Jun. 11, 1991

[54] RING LASER GYROSCOPE ARRANGED FOR MAINTAINING IONIZED GAS DISCHARGE TRANSVERSE TO THE OPTICAL AXIS OF THE GYROSCOPE

[75] Inventor: Joseph P. Ficalora, Oak Ridge, N.J.

[73] Assignee: Allied-Signal Inc., Morris Township, Morris County, N.J.

[21] Appl. No.: 488,186

[22] Filed: Mar. 5, 1990

[51] Int. Cl.$^5$ .................................................. G01C 19/64
[52] U.S. Cl. ........................................ 356/350; 372/94
[58] Field of Search ............................ 356/350; 372/94

[56] References Cited

U.S. PATENT DOCUMENTS

| | | | |
|---|---|---|---|
| 3,503,005 | 3/1970 | Mocker | 356/350 |
| 4,007,431 | 2/1976 | Abbink et al. | 356/350 |
| 4,317,089 | 2/1982 | Grant et al. | 372/94 |
| 4,867,567 | 9/1989 | Fidric | 356/350 |

Primary Examiner—Samuel Turner
Attorney, Agent, or Firm—Howard G. Massung; Robert A. Walsh

[57] ABSTRACT

A ring laser gyro features an arrangement wherein the ionized gas atoms flowing in a sealed envelope in an optical cavity flow transverse to the optical axis of the gyro in the optical gain sections thereof, thereby eliminating gas flow bias errors. An arrangement of the type described has the added advantage of providing a larger gas reservoir in small ring laser gyros which increases the life of the gyro. The transverse discharge arrangement obviates the necessity of equal curents flowing through gas ionizing electrodes and minimizes the tendency for gas flow oscillations at high current values.

10 Claims, 3 Drawing Sheets

RING LASER GYROSCOPE ARRANGED FOR MAINTAINING IONIZED GAS DISCHARGE TRANSVERSE TO THE OPTICAL AXIS OF THE GYROSCOPE

BACKGROUND OF THE INVENTION

This invention relates generally to ring laser gyroscopes (gyros) and particularly to a ring laser gyro arranged for supporting plasma excitation and optical gain transverse to rather than parallel with the optical axis of the gyro.

Ring laser gyros generally feature a base of a ceramic material having a low coefficient of thermal expansion and passageways within the base which, together with mirrors, form a closed optical cavity for counterpropagating beams of coherent light. The base forms a sealed envelope containing a suitable gas under a low pressure in the closed optical cavity. Electrodes (two anodes and a common cathode) are disposed in communication with the optical cavity so that an electrical potential sufficient to support plasma excitation and lasing is maintained in the gas. As is well known in the ring laser gyro art, the laser has a gain section which is that portion of the closed optical cavity in which the electrodes, when energized, maintain a discharge in the ionized gas or plasma.

In conventional arrangements, this discharge is in a direction parallel to the optical axis of the gyro. It has been found that in these arrangements gas flow bias errors are introduced into the gyro. Also, the gas volume within the closed optical cavity is limited; movement of the gas atoms in the optical cavity requires substantially equal currents through the two anodes; and there is a distinct tendency for gas flow oscillations at high current values.

The arrangement of the present invention tends to avoid these disadvantages by permitting the gas atoms to flow in a direction transverse to the optical axis, whereby the aforenoted gas flow bias error is minimized.

The transverse discharge arrangement has particular applicability to small gyros where discharge space is at a premium in that increased gas volume is offered which increases gyro operating and storage life as will now be recognized.

SUMMARY OF THE INVENTION

This invention contemplates a ring laser gyro of the type described which is arranged for maintaining ionized gas discharge in a direction transverse to the optical axis of the gyro. The gyro electrodes are arranged with passageways in the gyro base so that the atoms of a gas contained in a sealed envelope formed by the base flow transverse to the optical axis at least in the optical gain regions of the gyro. The arrangement described is advantageous over conventional arrangements, wherein the electrodes are arranged so that the gas atoms flow in a direction parallel to the optical axis, in that gas flow bias errors are minimized. The described arrangement is particularly advantageous in small ring laser gyros since a larger gas reservoir is provided which tends to increase the overall life of the gyro.

DETAILED DESCRIPTION OF THE INVENTION

Figure 1:
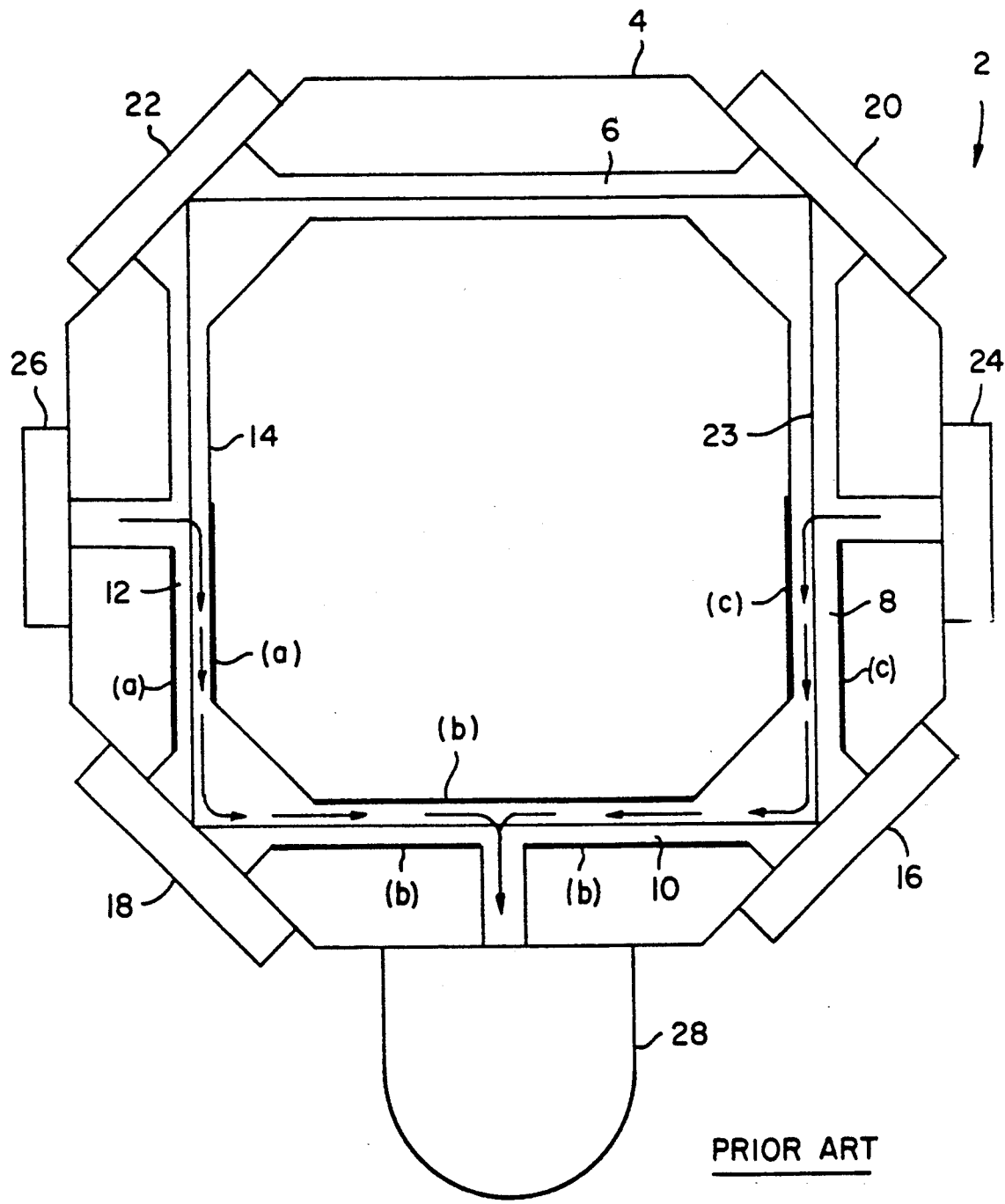
FIG. 1 is a diagrammatic representation showing, for purposes of illustration, a typical four sided ring laser gyro as is well known in the prior art.

With reference to FIG. 1, a prior art four sided ring laser gyro is designated by the numeral 2. Gyro 2 has a body 4 which is preferably of ceramic having a low coefficient of thermal expansion. Passageways 6, 8, 10 and 12 in body 4 form a closed cavity 14 for counterpropagating beams of coherent light.

Gyro 2 includes corner mirrors 16 and 18 at one of the extremities of each of the passageways 8 and 12, respectively. A readout mirror 20 is disposed at the opposite extremity of passageway 8 and a readout mirror 22 is disposed at the opposite extremity of passageway 12. The optical axis of the gyro extends around the four sides thereof and is designated by the numeral 23.

Base 4 forms a sealed envelope containing gas under a low pressure in optical cavity 14. A suitable gas for the purposes intended is the well known mixture of helium and neon. Electrodes are disposed in communication with optical cavity 14 so that an electrical potential sufficient to support excitation and lasing of the ionized gas or plasma may be maintained in the gas.

Thus, an electrode or anode 24 is disposed in passageway 8 between mirror 16 and rate readout prism 22, and an electrode or anode 26 is disposed in passageway 12 between mirror 16 and stabilization readout prism 20.

A cathode 28 is in communication with passageway 10. Cathode 28 is in a cooperative arrangement with anodes 24 and 26 through passageways 8 and 12, respectively. In this connection, it will be understood that anodes 24 and 26 are disposed with relation to cathode 28 at locations in optical path 14 which are selected to provide a desired length for the gain section of the laser relative to the length of the entire optical cavity. As is well known in the laser gyro art, the laser gain section is that portion of optical cavity 14 in which electrodes when energized will maintain a discharge in the ionized gas or plasma. Balanced electrical voltages are applied between anodes 24 and 26 and cathode 28 to provide substantially equal and therefore balanced plasma excitation currents flowing in the laser gain section.

With continued reference to FIG. 1, the optical gain sections of optical cavity 14 are designated as (a), (b) and (c), and the ionized gas or plasma atoms flow in passageways 8, 10 and 12 in the direction indicated by the arrows. It will thus be seen that the direction of flow of the atoms is substantially parallel to optical axis 23 in optical gain sections (a), (b) and (c).

It will be understood that the ring laser gyro so far described is of the type well known in the art and only as much of the gyro as is required for an understanding of the present invention as will be hereinafter disclosed has been illustrated and described.

It has been found that the prior art configuration shown in FIG. 1 has certain disadvantages. Among these disadvantages are the relatively small gas reservoir provided in the illustrated configuration. This tends to decrease the overall life of the gyro. Also, movement of the gas atoms requires substantially equal current flowing through anodes 24 and 26 which can be difficult to achieve. Further, with the arrangement shown, gas flow oscillation tends to occur at high current values which deteriorates gyro performance. A ring laser gyro in accordance with the configuration to be next described tends to minimize these disadvantages.

Figure 2:
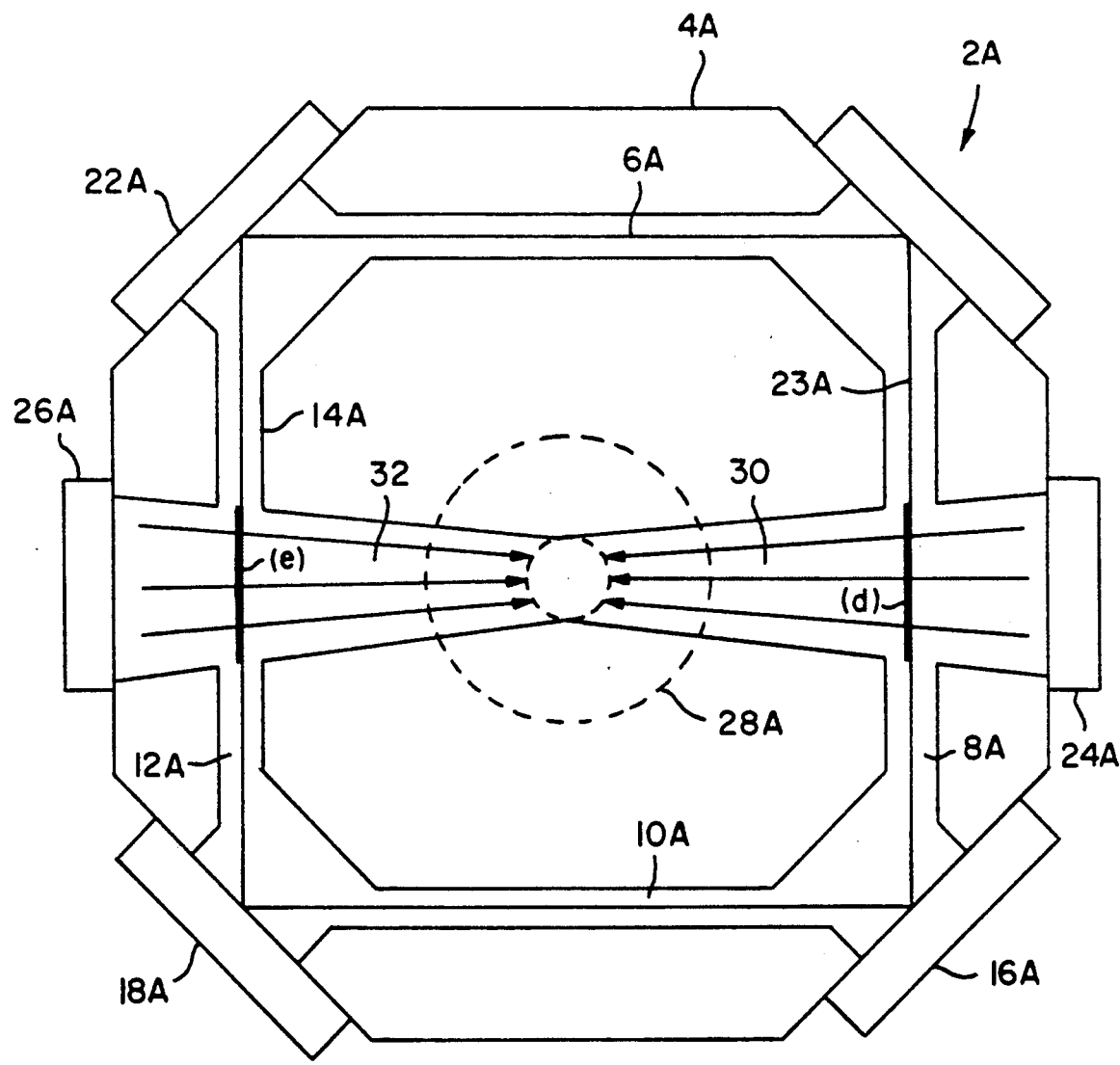
FIG. 2 is a diagrammatic representation showing the ring laser gyro of FIG. 1 arranged in accordance with the invention.

With reference to FIG. 2, a four sided ring laser gyro of the type shown in FIG. 1 is illustrated, with like elements having like numerical designations but carrying the subscript A. Thus, gyro 2A includes additional passageways 30 and 32 in base 4A extending from the center of the base substantially transverse to optical axis 23A in optical gain sections designated as (d) and (e). Passageways 30 and 32 are in communication with passageways 8A and 12A, respectively, to form a closed optical cavity 14A for counterpropagating beams of coherent light.

Cathode 28A is centrally disposed on the underside of base 4A and is in communication with passageway 8A through passageway 30 and with passageway 12A through passageway 32. Anode 24A is in communication with passageway 8A and anode 26A is in communication with passageway 12A.

With the arrangement shown and described, the direction of flow of the gas atoms is indicated by the arrows. Thus, said flow is substantially transverse to the direction of the optical axis in optical gain sections (d) and (e) as will be discerned from the Figure.

The arrangement shown and described with reference to FIG. 2 has particular advantages. A significantly lower gas flow bias results as does a greater capacity for gas storage due to the gas flow passageway arrangement including additional passageways 30 and 32. Also, lower running and starting voltages are experienced. Further, with such an arrangement better dynamic balance is achieved for dithering purposes as is often required in ring laser gyro configurations. Near zero magnetic sensitivity is realized and a large oscillation free operating window is available.

While the configuration in FIG. 2 shows only two sides of the described four sided gyro being used, the other two sides may be used for realizing greater optical gain as will now be recognized. Finally, with the arrangement described, tolerances of the plasma discharge passageways need not be closely held.

Figure 3:
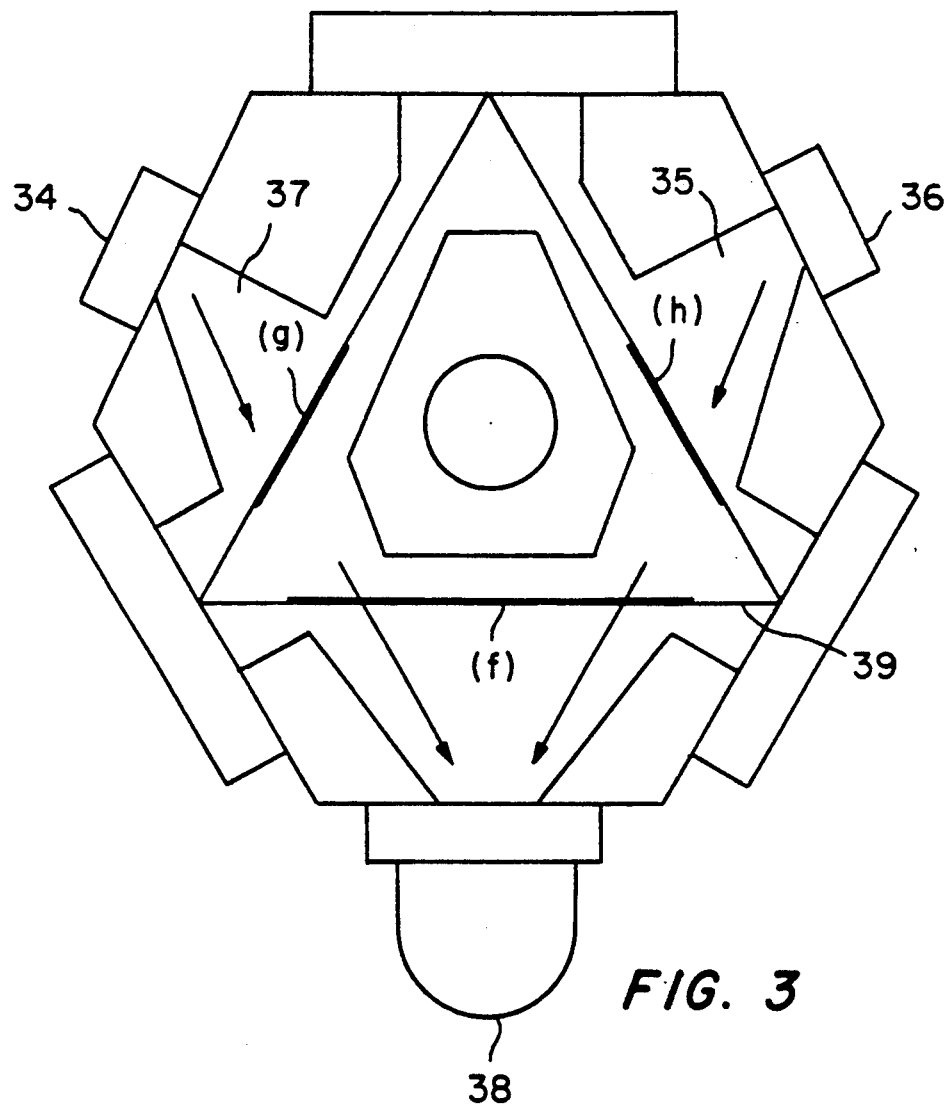
FIG. 3 is a diagrammatic representation showing a three sided ring laser gyro configuration arranged in accordance with the invention.

With reference to FIG. 3, a three sided ring laser gyro is shown, with the transverse discharge feature of the invention incorporated into the gyro configuration. Thus, the gyro includes anodes 34 and 36 and a cathode 38 in communication therewith through appropriate passageways 35 and 37 as heretofore described. The optical axis of the gyro is designated by the numeral 39 and the optical gain regions carry the designations (f), (g), and (h) as indicated in the Figure. Passageways 35 and 37 are generally transverse to optical axis 39. The arrangement is such that the gas atoms flow generally transverse to optical axis 39 in the optical gain sections as indicated by the arrows.

The configuration shown in FIG. 3 is of particular significance with gyros having a small optical path length. Since the life of such small gyros is limited by, among other things, the total gas volume, it has been found that the arrangement described allows for increases in the gas volume inside the gyro cavity due to the illustrated passageway arrangement, as will be recognized as desirable.

There has thus been described a ring laser gyro in which the gas atoms flow transverse to the optical axis of the gyro at least in the optical gain sections. In a configuration of the type described much of the gas flow bias error is removed. Simply stated, the gas atoms that normally emit photons in a stimulated emission situation will still do so but the photons will be emitted transverse rather than parallel to the optical axis.

It will be recognized that the best results for the purposes desired are achieved when the gas atoms flow as nearly normal to the optical axis as possible. This is achieved in the form of the invention shown in FIG. 2 wherein the flow is substantially transverse to the optical axis, and in FIG. 3 wherein the flow is generally transverse to said axis.

The transverse discharge configuration has particular applicability to small gyros where discharge space is at a premium. This is also one of the reasons why a transverse discharge configuration is most useful for three sided gyros, as particularly shown in FIG. 3 and in further consideration of the fact that increased gas volume is provided which increases gyro operating and storage life.

With the above description of the invention in mind, reference is made to the claims appended hereto for a definition of the scope of the invention.

What is claimed is:

1. A ring laser gyro comprising:
a base;
passageways within the base which, together with mirrors, form a closed optical cavity for counterpropagating beams of coherent light traveling around an optical axis;
the base forming a sealed envelope containing a gas under a low pressure in the closed optical cavity;
electrodes disposed in communication with the closed optical cavity so that when said electrodes are energized an electrical potential sufficient to support ionized gas excitation and optical gain is maintained in the gas;
the closed optical cavity having optical gain sections which are the portions of the closed optical cavity in which the energized electrodes maintain an ionized gas discharge; and
the electrodes and the closed optical cavity arranged so that said discharge is generally transverse to the direction of the optical axis.

2. A ring laser gyro as described by claim 1, wherein:
the electrodes and the closed optical cavity are arranged so that said discharge is generally transverse to the direction of the optical axis at least in the optical gain sections.

3. A ring laser gyro comprising:
a base;
passageways within the base which, together with mirrors, form a closed optical cavity for counterpropagating beams of coherent light traveling around an optical axis;
the base forming a sealed envelope containing a gas under a low pressure in the closed optical cavity;
electrodes disposed in communication with the closed optical cavity so that when said electrodes are energized an electrical potential sufficient to support ionized gas excitation and optical gain is maintained in the gas;

the closed optical cavity having optical gain sections which are the portions of the closed optical cavity in which the energized electrodes maintain an ionized gas discharge; and the electrodes and the closed optical cavity arranged so that said discharge is substantially transverse to the direction of the optical axis.

4. A ring laser gyro as described by claim 3, wherein:
the electrodes and the closed optical cavity are arranged so that said discharge is substantially transverse to the direction of the optical axis at least in the optical gain sections.

5. A ring laser gyro comprising:
a base;
passageways within the base which, together with mirrors, form a closed optical cavity for counter-propagating beams of coherent light traveling around an optical axis;
the base forming a sealed envelop containing a gas under a low pressure in the closed optical cavity;
electrodes disposed in communication with the closed optical cavity so that when said electrodes are energized an electrical potential sufficient to support ionized gas excitation and optical gain is maintained in the gas;
the closed optical cavity having optical gain sections which are the portions of the closed optical cavity in which the energized electrodes maintain an ionized gas discharge; and
the electrodes arranged with the closed optical cavity so that the ionized gas discharge is transverse to the direction of the optical axis for minimizing gas flow bias errors in the gyro.

6. A ring laser gyro as described by claim 5, wherein:
the electrodes are arranged with the closed optical cavity so that the ionized gas discharge is generally transverse to the direction of the optical axis at least in the optical gain sections.

7. A ring laser gyro as described by claim 5, wherein:
the electrodes are arranged with the closed optical cavity so that the ionized gas discharge is substantially transverse to the direction of the optical axis at least in the optical gain sections.

8. A ring laser gyro comprising:
a base;
passageways within the base which, together with mirrors, form a closed optical cavity for counter-propagating beams of coherent light traveling around an optical axis;
the base forming a sealed envelope containing a gas under a low pressure in the closed optical cavity;
electrodes disposed in communication with the closed optical cavity so that when said electrodes are energized an electrical potential sufficient to support ionized gas excitation and optical gain is maintained in the gas;
the closed optical cavity having optical gain sections which are the portions of the closed optical cavity in which the energized electrodes maintain an ionized gas discharge; and
the electrodes arranged with the closed optical cavity so that the ionized gas discharge is transverse to the direction of the optical axis at least in the optical gain sections, whereby the size of the optical cavity is increased for increasing the gas volume within the optical cavity.

9. A ring laser gyro as described by claim 8, wherein:
the electrodes are arranged with the closed optical cavity so that the ionized gas discharge is generally transverse to the direction of the optical axis at least in the optical gain sections.

10. A ring laser gyro as described by claim 8, wherein:
the electrodes are arranged with the closed optical cavity so that the ionized gas discharge is substantially transverse to the direction of the optical axis at least in the optical gain sections.

* * * * *